UNITED STATES PATENT OFFICE

DANIEL M. LAMB, OF STRATHROY, CANADA.

IMPROVEMENT IN THE PRODUCTION OF WATER-PROOF GUM.

Specification forming part of Letters Patent No. 140,281, dated June 24, 1873; application filed May 3, 1873.

*To all whom it may concern:*

Be it known that I, DANIEL MARTIN LAMB, of Strathroy, in the county of Middlesex and Province of Ontario, Canada, machinist, have invented, discovered, or produced a new and useful Water-Proof Gum, of which the following is a specification:

My invention consists in the production of a new water-proof gum, suitable for many purposes in the arts, capable of being vulcanized, and, when so vulcanized, possessing many of the characteristics of vulcanized rubber or gutta percha, which gum I produce by extracting the caoutchouc contained in plants of the asclepias or milk-weed family, and other analogous plants possessing like properties, and inspissating it by evaporation, thus producing a gum hard enough for manipulation.

In the specification of another application filed simultaneously herewith, I have set forth the best and cheapest way now known to me of extracting the gum, which way consists in fermenting the plant when in a green state, straining out the juice either with or without pressure, and inspissating the gummy liquid thus separated from the woody fiber. This separation obviously, however, might be effected in other more expensive ways—such, for instance, as pressing the juice from the plants without fermentation, and then treating that juice.

It has long been known to botanists and chemists that the juice of plants of the milk-weed family contains a gum similar to caoutchouc; but so far as my knowledge extends, no one prior to the date of my discovery and invention had succeeded in utilizing this gum, as an article of commerce.

I claim as my invention—

As a new article of manufacture, water-proof gum, made from the inspissated juice of plants of the asclepias or milk-weed family, or of any analogous plants possessing like properties.

DANIEL M. LAMB.

Witnesses:
  M. KNOWLTON,
  OCTAVIUS KNIGHT.